United States Patent [19]

Uchiyama et al.

[11] Patent Number: 4,843,412

[45] Date of Patent: Jun. 27, 1989

[54] FILM SUPPLYING APPARATUS

[75] Inventors: Kaoru Uchiyama; Haruo Takase, both of Tokyo; Kiichiro Sakamoto, Kanagawa; Kazushige Uenaka, Tokyo; Masakazu Kokubu, Tokyo; Masuo Akimoto, Tokyo, all of Japan

[73] Assignee: Fuji Photo Film Co., Ltd., Kanagawa, Japan

[21] Appl. No.: 204,315

[22] Filed: Jun. 9, 1988

Related U.S. Application Data

[62] Division of Ser. No. 39,866, Apr. 20, 1987.

[30] Foreign Application Priority Data

| | | | |
|---|---|---|---|
| Apr. 18, 1986 | [JP] | Japan | 61-90382 |
| Apr. 18, 1986 | [JP] | Japan | 61-90383 |
| Aug. 28, 1986 | [JP] | Japan | 61-202553 |
| Aug. 29, 1986 | [JP] | Japan | 61-203475 |
| Sep. 1, 1986 | [JP] | Japan | 61-205708 |
| Sep. 1, 1986 | [JP] | Japan | 61-205710 |
| Sep. 1, 1986 | [JP] | Japan | 61-205711 |

[51] Int. Cl.[4] .......... G03B 17/26; G03B 3/13

[52] U.S. Cl. .......... 354/275; 354/319; 242/71.1

[58] Field of Search .......... 354/174, 275, 319, 320, 354/321, 322; 352/72, 78 R; 242/71.1, 71.2, 71.7

[56] References Cited

U.S. PATENT DOCUMENTS

| | | | |
|---|---|---|---|
| 3,692,391 | 9/1972 | Winkler | 352/72 |
| 3,776,483 | 12/1973 | Reitter | 242/71.1 |
| 3,820,136 | 6/1974 | Kennedy | 354/174 |
| 3,903,535 | 9/1975 | Moodie et al. | 354/174 |
| 4,442,744 | 4/1984 | Raymond | 354/319 |
| 4,613,221 | 9/1986 | Takase et al. | 354/321 |
| 4,731,628 | 3/1988 | Uenaka et al. | 354/319 |

*Primary Examiner*—A. A. Mathews

*Attorney, Agent, or Firm*—Sughrue, Mion, Zinn, Macpeak & Seas

[57] ABSTRACT

A plurality of patrones accommodating films to be developed are housed in a magazine, and this magazine is connected to a developing system. A conveyor for consecutively feeding leaders connected to the tips of the films is provided in the magazine, and these leaders are fed one by one into the developing system, whereby all the films are automatically developed.

12 Claims, 16 Drawing Sheets

FILM SUPPLYING APPARATUS

This is a division of application Ser. No. 039,866, filed Apr. 20, 1987.

BACKGROUND OF THE INVENTION

Field of the Invention

The present invention relates to a film supplying apparatus for supplying a photographed film to a developing system.

A photographed film is accommodated in such a film container as a cassette (film cartridge) and, in order to develop it, it is therefore necessary to withdraw the film from the cassette and supply it to a developing system.

For this purpose, a developing system is conventionally used which is arranged such that, after causing an end of the film to project from the tip of the patrone and fixing a leader to that tip portion, development is effected while the film is being led and guided into the developing system by feeding this leader into the developing system.

However, after all the film inside the patrone has been led into the developing system, it is necessary to manually fix again to the developing system a patrone accommodating the film to be developed next. For this reason, in cases where a multiplicity of films ar to be developed, an operator must attend to the developing system, with the result that the work efficiency declines.

SUMMARY OF THE INVENTION

Accordingly, an object of the present invention is to provide a film supplying apparatus which is capable of automatically supplying a multiplicity of films to a developing system, by overcoming the drawback of the prior art.

To this end, according to the present invention, there is provided a film supplying apparatus in which a thin leader is fixed to a film projecting from a film container, the leader is fed to a developing system, and the leader is caused to lead the film to effect development processing, the apparatus comprising: (a) a magazine for accommodating a plurality of the film containers arranged in order; (b) feeding means for feeding the film containers accommodated in the magazine consecutively in the direction of the developing system from a tip of the magazine; and (c) feeding-in means for feeding the fed leaders in the film containers into the developing system, whereby the films in the film containers disposed inside the magazine are automatically supplied to the developing system, starting with the foremost film container among the film containers.

Therefore, if the magazine is set, the film containers located at the forward end of the magazine are fed consecutively to the developing system, and the leaders of the film containers are fed to the developing system while being held by the feeding means. Accordingly, the films are thus fed to the developing system while being guided by the leaders, and development is effected automatically.

After the film accommodated in the first film container has been developed, the ensuing film container is fed from the magazine to the developing system by means of the feeding means and the feeding-in means.

Consequently, the multiplicity of films accommodated in the magazine are consecutively developed and processed, so that the operator only need to set the magazine accommodating the multiplicity of films in the developing system, thereby allowing the work efficiency to be improved substantially.

The above and other objects and features of the present invention will become apparent from the following detailed description of the invention when read in conjunction with the accompanying drawings.

DESCRIPTION OF THE PREFERRED EMBODIMENTS

Figure 3A:
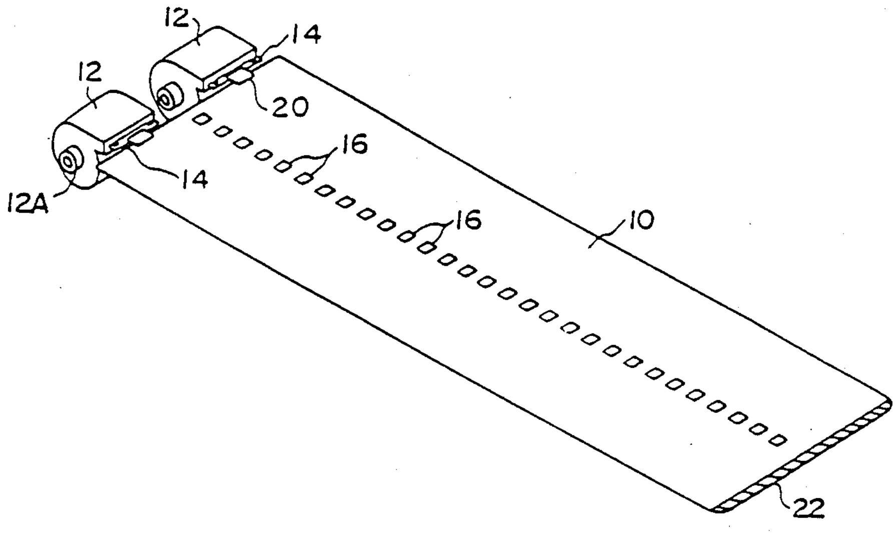
FIG. 3A is a perspective view illustrating a state in which a leader is fixed to the tips of films projecting from cassettes.
Figure 3B:
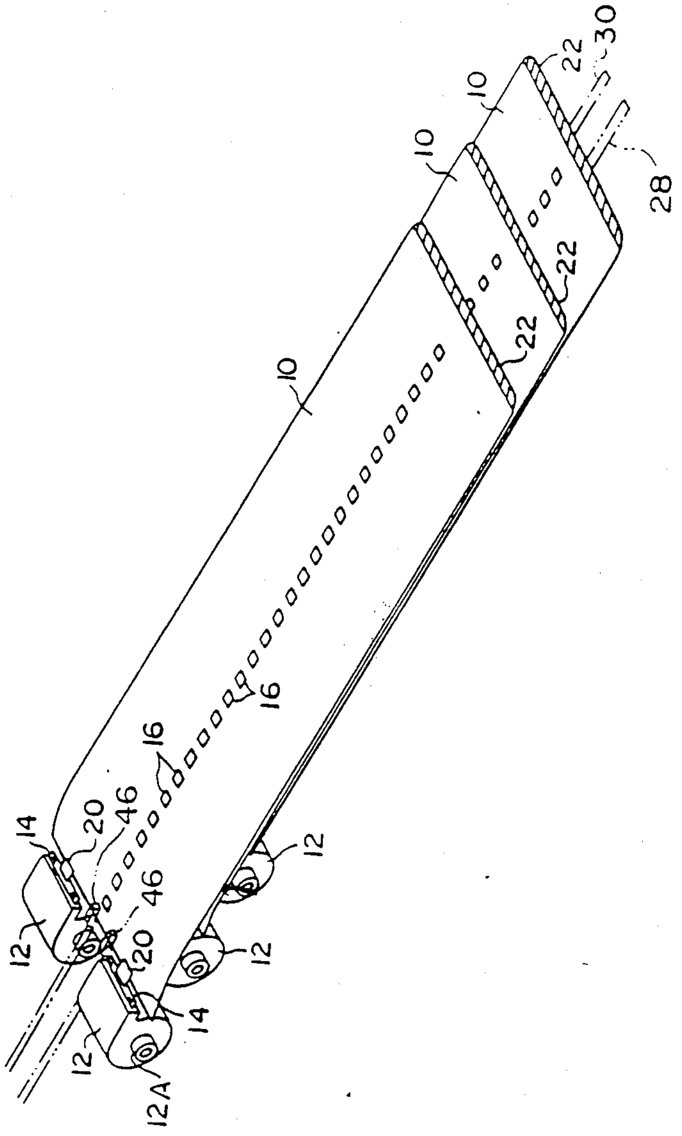
FIG. 3B is a perspective view illustrating a state in which a plurality of leaders are loaded.

FIG. 3A shows a state in which a leader 10 used in this embodiment is fixed to the tips of films 14 projecting from patrones 14, i.e., film containers. The film 14 has its proximal end retained by a winding core 12A disposed inside the cassettes 12. The leader 10 is formed by a thin sheet material such as a synthetic resin or the like and has a plurality of openings 16 formed along the longitudinal direction thereof FIG. 3B shows a state in which a plurality of leaders 10 are loaded.

An adhesive tape 20 is used to connect the film 14 and the leader 10. In addition, an identifying mark 22 of a narrow width is provided along the entire width of the other end portion of the leader 10.

Figure 4:
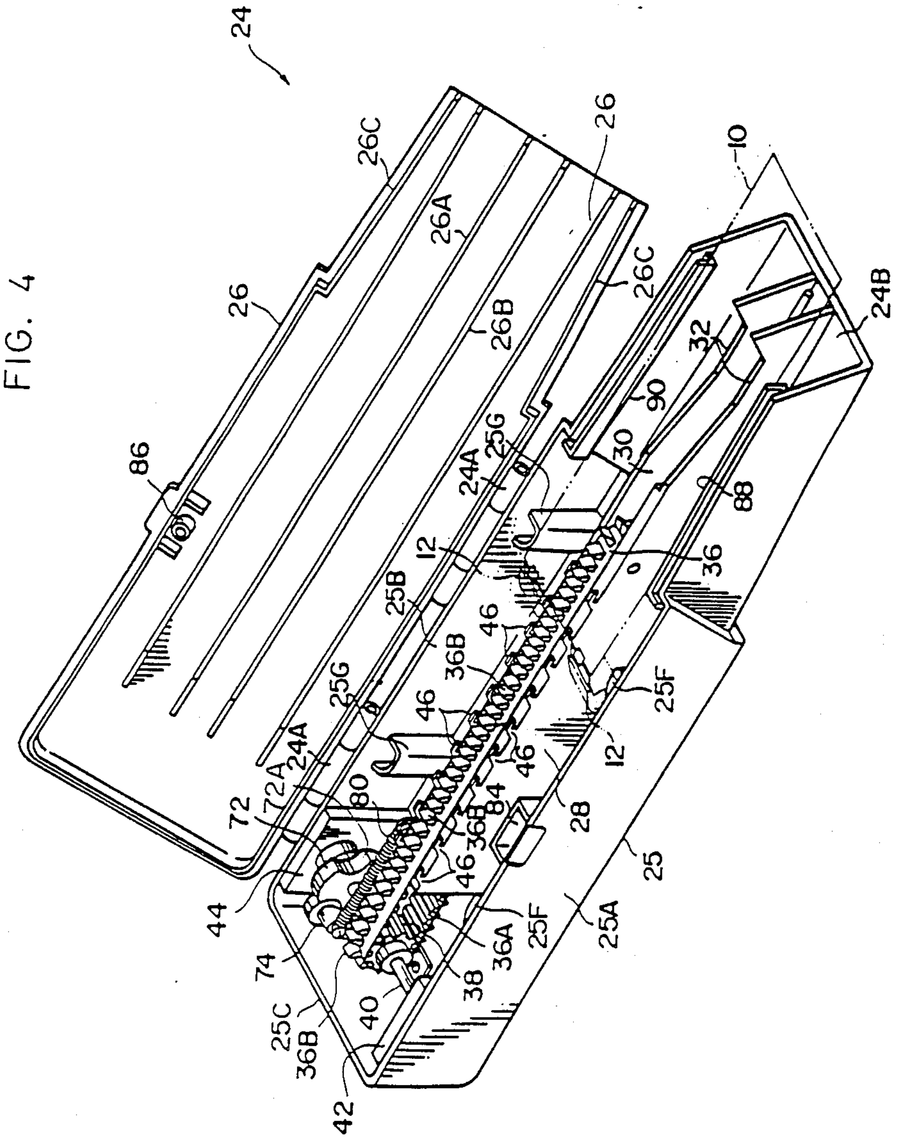
FIG. 4 is a perspective view of the film supplying magazine with its cover open.

FIG. 4 shows a magazine 24 in which the leader 10 and the film 14 are accommodated. This magazine 24 has the shape of a box and is arranged such that, if a cover 26 which is made openable via hinges 24A disposed at an upper end portion of a main body 25 of the magazine is closed, the light is prevented from entering the inside of magazine 24, excluding a pair of film supplying ports 24B.

A pair of upright walls 28, 30 are formed longitudinally inside the main body 25 of the magazine in the central portion thereof in the direction of its width. The apex surfaces of these upright walls 28, 30 constitute surfaces for mounting the leader, and the spaces between these upright walls 28, 30 and side walls 25A, 25B of the main body of the magazine respectively serve to accommodate the patrones 12.

A recess 32 whose height is reduced over a certain length is formed in each of the upright walls 28, 30 in the vicinity of the film supplying port 24B so as to constitute a supporting surface for the leader 10. In other words, since the leader 10 is formed of a flexible thin material of such as a synthetic resin or the like and maintains the state of a flat surface in a free state, the leader 10 maintains the state of a flat state even if it is placed on the upright walls 28, 30 despite the fact that recesses 32 are formed However, the arrangement is such that if it is subjected to a compressive force in the longitudinal direction, the leader 10 is elastically bent and assumes a bent state along the recesses 32, so that its tip portion is capable of assuming a diagonally upwardly oriented state as compared with the free state.

Figure 6:
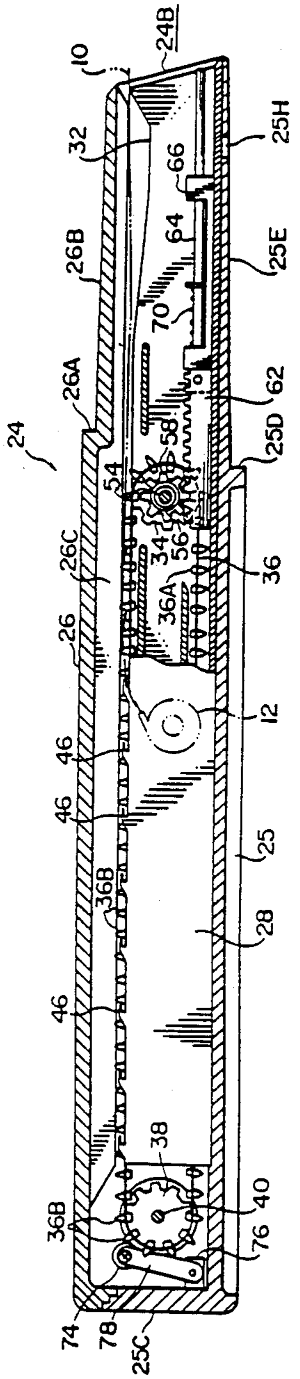
FIG. 6 is a longitudinal cross-sectional view of the magazine taken along the line VI—VI of FIG. 5.

A gear (sprocket wheel) 34 is pivotally supported between the upright walls 28, 30, as shown in FIG. 6, and a portion of the inner peripheral surface of an endless conveyor belt 36, which serves as a leader feeding means, is engaged with the gear 34 at engaging projections 36A. In addition, another portion of the inner peripheral surface of the endless conveyor belt 36 is wound around and engaged with a gear 38 interposed between the upright walls 28, 30 in the vicinity of a rear wall 25C of the magazine. This gear 38 is secured to a rotary shaft 40, the both ends of which are pivotally supported by the main body 25 of the magazine via brackets 42, 44, respectively.

Consequently, the endless conveyor belt 36 assumes a parallel state between the gears 34, 38, and engaging projections 36B projecting from the outer periphery thereof at regular intervals project from the upright walls 28, 30 and are adapted to engage with openings 16 of the leader 10 placed on the upright walls 28, 30.

The plurality of engaging projections 36B projecting from the outer periphery of the endless conveyor belt 36 are used for driving the leader 10 as they are inserted into the openings 16 formed in the leader 10.

Reverse L-shaped engaging projections 46 project upwardly from the upright walls 28, 30 and are adapted to allow the film installing end portions of the leaders 10, respectively. The leaders 10 are installed and positioned at the intervals of these engaging projections 46.

Accordingly, if the end portions of the plurality of the leaders 10 are accommodated in the respective engaging projections 46, and the engaging portions 16 are engaged with the engaging projections. 36B, as shown in FIG. 3B, the leaders 10 are mounted on the upright walls 28, 30 at the regular intervals, and the marks 22 at their tip portions are exposed at the regular intervals. Therefore, the. operator is able to detect a state in which the leaders 10 have been mounted accurately.

On the cover 26 are formed a pair of ribs 26A and 26B at a central portion in the width direction thereof such as to be parallel with each other along the longitudinal direction thereof. These ribs 26A, 26B are disposed such as to face the upper end portions of the upright walls 28, 30, respectively, with the cover 26 closed over the main body 25 of the magazine. This arrangement facilitates the tip portions of the engaging projections 36B to be accommodated in the openings 16 of the leaders 10 securely Thus, consideration is paid so that the leaders 10 will not be removed carelessly from the engaging projections with the cover closed over the main body 25 of the magazine.

Also, projections entering the recesses 32 of the upright walls 28, 30 may be provided on these ribs 26A, 26B so as to bend the leaders 10 with the cover 26 closed.

Figure 7:
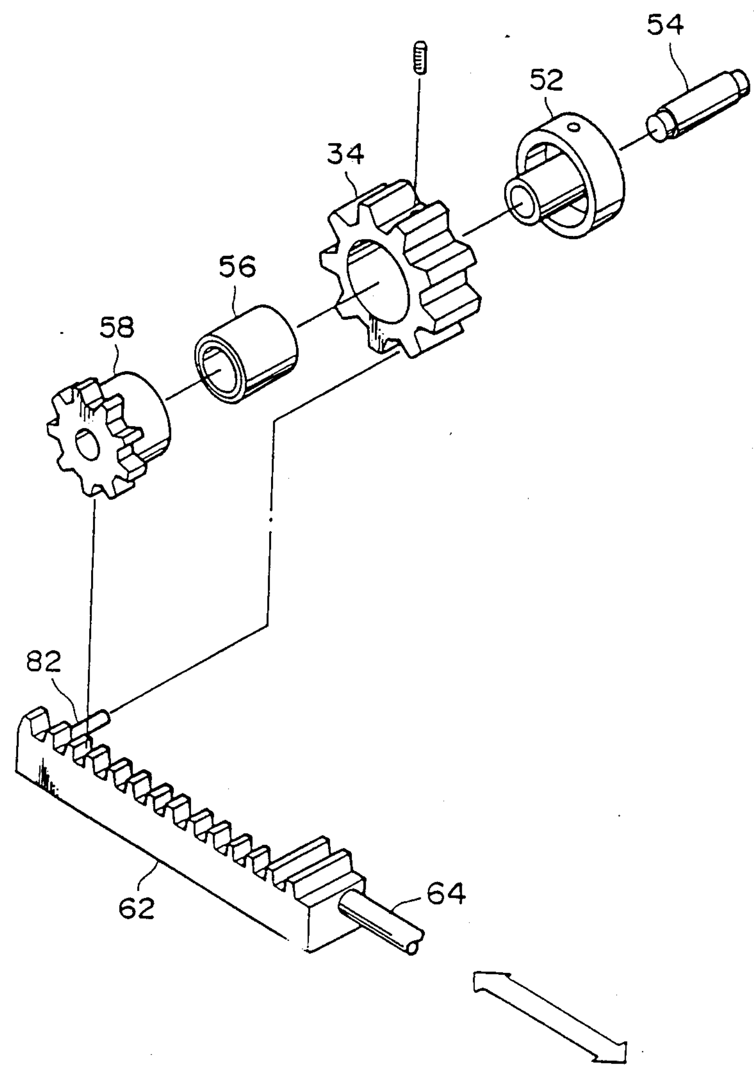
FIG. 7 is an exploded perspective view illustrating the relationships between a stopper and an endless belt driving gear disposed in the magazine.

The gear 34 disposed between the upright walls 28, 30 is pivotally supported by a pin 54 via a sleeve 52, as shown in FIG. 7. This pin 54 is pivotally supported by the upright walls 28, 30. A pinion 58 is pivotally supported by the outer periphery of the sleeve 52 via a one-way clutch 56. The one-way clutch 56 is adapted to transmit only the clockwise rotation of the pinion 58, as viewed in FIG. 7, as the clockwise rotation of the sleeve 52 and the gear 34. A rack 62 which is linearly slidably guided between the upright walls 28, 30 meshes with the pinion 58. An end portion of this rack is connected to a rod 64, which is linearly slidably guided as it is formed such as to penetrate through a guide block 66 installed in the main body 25 of the magazine The tip portion of the rod 64 is exposed from the film supplying port 24B. The arrangement is such that, when the rod 64 is inserted into the main body 25 of the magazine, the rack 62 rotates the pinion 58 clockwise as viewed in FIGS. 6 and 7 so as to move the endless conveyor belt 36 via the gear 34 by a required length of the leaders 10 to be fed. Hence, the tip portions of the leaders 10 are fed to the developing system 68.

Since the rod is urged by the urging force of a compression coil spring 70 in the direction of projecting from the film supplying port 24B of the main body 25 of the magazine, the rack 62 is reset if the compressive force for the rod 64 is canceled However, since the one-way clutch 56 is provided, the gear 34 will not rotate reversely counterclockwise as viewed in FIGS. 6 and 7.

With respect to the gear 38 around which another portion of the endless conveyor belt 36 is wound to be supported by the same, its rotary shaft 40 is adapted to rotate at predetermined angles by means of an adjusting means In other words, a cam 72 is secured to the rotary shaft 40 disposed between the gear 38 and the bracket 44. Three indented portions 72A are formed on the outer periphery of this cam 72, so that a roller 74 will be received thereby. This roller 74 is fixed to the distal end portion of an arm 78 which is pivotally supported by the main body 25 of the magazine via a bracket 76. A tensile coil spring 80 is provided on the arm 78 such as to stretch between the same and the upright wall 30. Consequently, if the endless conveyor belt 36 is rotated by a required length of the leaders 10 to be fed, the roller 74 moves into the indented portion 72A so as to stop the endless conveyor belt 36.

To ensure this stopped state, a stopper pin 82 is arranged to correspond with the gear 34, as shown in Fig. 7. I other words, the stopper pin 82 projects from the rack 62 and is caught between the adjacent teeth of the gear 34. However, when the rack 62 moves leftwardly as viewed in FIG. 6 and the gear 34 is subjected to a rotational force via the pinion 58 and the one-way clutch 56, this stopper pin 82 moves together with the rack 62 and projects outside the locus of rotation of the gear 34, thereby allowing the gear 34 to rotate.

Consequently, the gear 34 is rotated only by an necessary angle, and the rack 62, at the time when it is reset, is inserted into the locus of rotation of the gear 34, i.e., between the adjacent teeth, thereby stopping the rotation of the gear 34. As a result, the plurality of leaders 10 are adhered to each other, and even if, when the forward end of the leader 10 is fed to the developing system upon receipt of a tensile force, the ensuing leader 10 carelessly produces a force to rotate the endless conveyor belt 36 upon receipt of the tensile force by means of a frictional force and the like, the endless conveyor belt 36 will not move since it is posively prevented from rotating.

Figure 5:
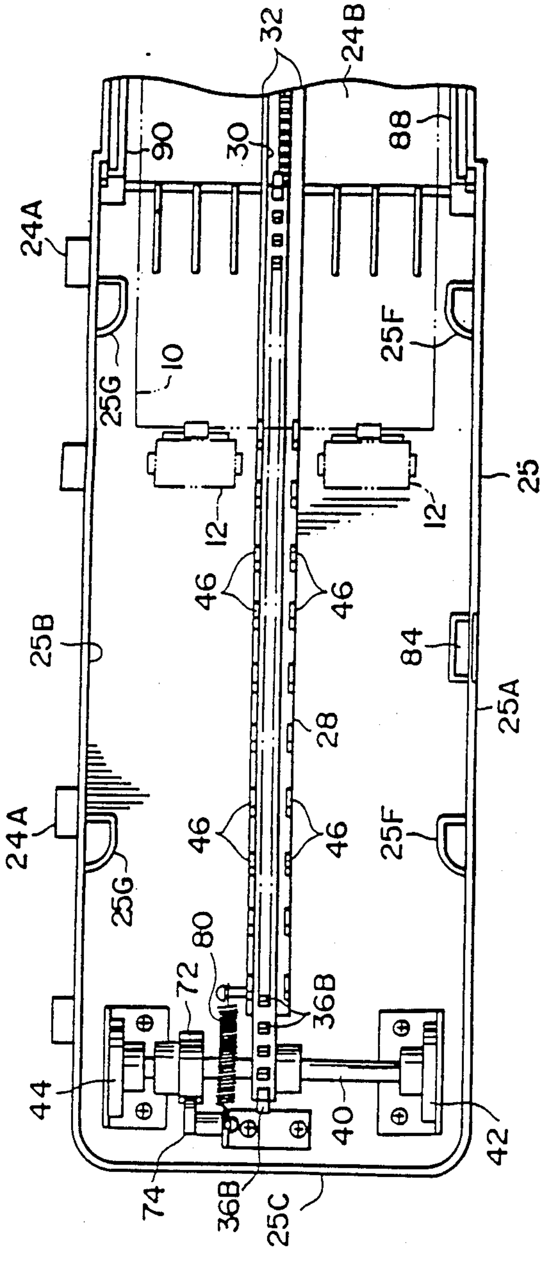
FIG. 5 is a top plan view of the magazine with its cover open.

Incidentally, as shown in FIG. 6, the portions of the main body 25 of the magazine and the cover 26 adjacent to the tip portions thereof are formed as small-diameter portions 25E, 26B and serve as a portion for insertion into the developing system 68. In addition, as shown in FIG. 5, two pairs of projections 25F, 25G each having a partially circular shape in plan view project from the side walls 25A, 25B, respectively. These projections 25F, 25G serve as guides so that the space defined by these projections and the upright walls 28, 30 will become space for accommodating patrones 12.

A portion for fixing a magnet 84 for maintaining the cover 26 closed with respect to the main body 25 of the magazine is disposed between the pair of projections 25F. An adsorbing member 86 is installed on the cover 26 such as to correspond with this magnet 84.

Guide protrusions 88, 90 are formed at the upper end portions of the inner surfaces of the side walls A, 25B adjacent to the portion of the main body 25 of the magazine in the vicinity of the tip portion thereof Projecting ribs 26C provided on the cover 26 are accommodated in these guide protrusions 88, 90 to prevent light from entering the inside of the main body 25 of the magazine.

Figure 1:
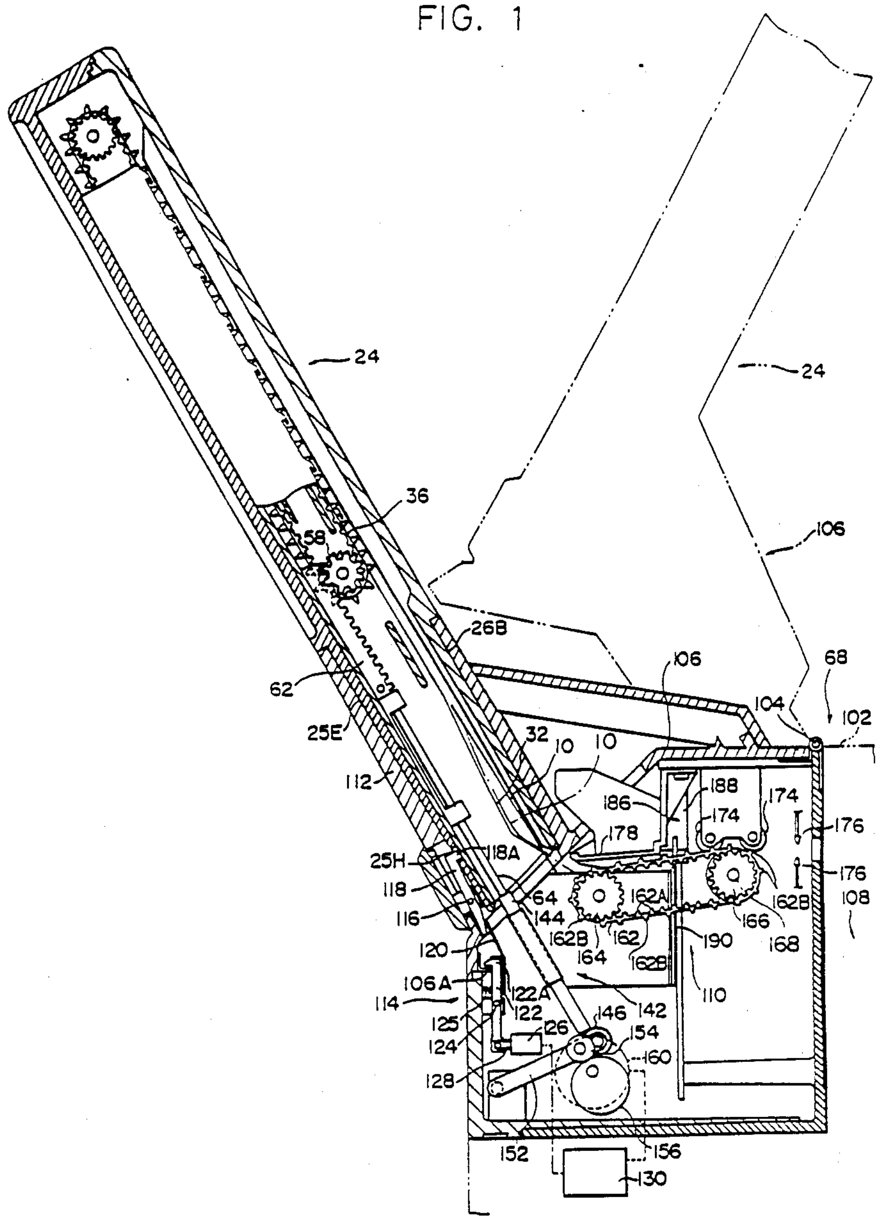
FIG. 1 is a longitudinal cross-sectional view of a film supplying apparatus in accordance with the present invention corresponding to a longitudinal cross section taken along the line I—I of FIG. 2, and illustrates a state of connection between a film supplying magazine and a developing system to which the present invention is applied.

As shown in FIG. 1, a supplying section cover 106 is provided on the developing system 68 such as to be connected to the main body 102 of the developing system 68 This supplying section cover 106 is adapted to cover a supplying section for supplying the films 14 fed from the magazine 24 to a developing section 108 of the developing system 68.

A cylindrical portion 112 of the supplying section cover 106 which serves as a connecting portion for the magazine projects diagonally upward from the supplying section cover 106 and is adapted to accommodate the small-diameter portions 25E, 26B of the main body 25 of the magazine. Consequently, the cover 26 will not open with the small-diameter portions 25E, 26B inserted into the cylindrical portion 112. The supplying section is provided with a lock means 114, to ensure that, if developing work is started with the magazine 24 inserted, the magazine 24 cannot be pulled out, or the supplying section cover 106 cannot be opened carelessly.

In other words, an intermediate portion of an arm 118 is pivotally supported by the cylindrical portion 112 by means of a pin 116. This arm 118 constitutes a magazine-pulling-out prevention means and is arranged such that a hook portion 118A provided at the distal end thereof corresponds with an opening 25H formed in the vicinity of the tip portion of the main body 25 of the magazine The arm 118 is urged by its own weight in the direction of separating from the opening 25H.

However, the end portion of this arm 118 opposite to the hook portion 118A corresponds with an arm 120, and the arrangement is such that the hook portion 118A engages with the opening 25H on receipt of the driving force of the arm 120. The arm 120 is secured to one end of an arm 12, an intermediate portion of the arm 122 being pivotally supported by the main body 102 by means of a pin 124. A hook portion 122A is formed in the vicinity of an end portion of the arm 122 where the arm 120 is fixed. This hook portion 122A constitutes a cover-opening prevention means for the supplying section cover 106 in correspondence with a hook 106A projecting to the inside of the supplying section cover 106 by means of the urging force of a compression coil spring 125.

In addition, the end portion of the arm 122 on the opposite side of the hook 122A is pivotally supported by a plunger 128 of a solenoid 126. The solenoid 126 is adapted to receive a driving force by means of a control circuit 130 of the developing system 68. This control circuit 130 is arranged as follows When development is started, the control circuit 130 allows the solenoid 126 to be energized so as to rotate the arm 122 in opposition to the urging force of the compression coil spring 125, thereby causing the hook portion 122A to engage with the hook 106A. At the same time, the arm 118 is rotated via the arm 120, thereby causing the hook portion 118A to engage with the opening 25H. Consequently, the supplying section cover 106 is not carelessly opened during development work, and the magazine 24 is not withdrawn carelessly from the cylindrical portion 112.

Figure 9:
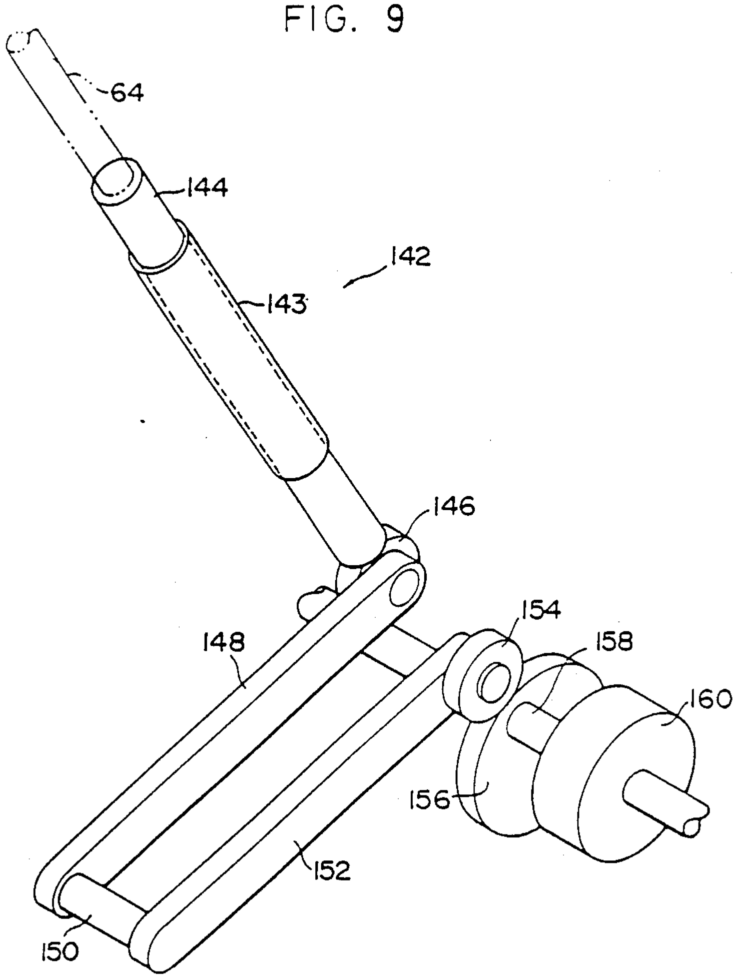
FIG. 9 is a perspective view of a driving mechanism for driving a film feeding means in the maganize disposed in a film supplying section.
Figure 10:
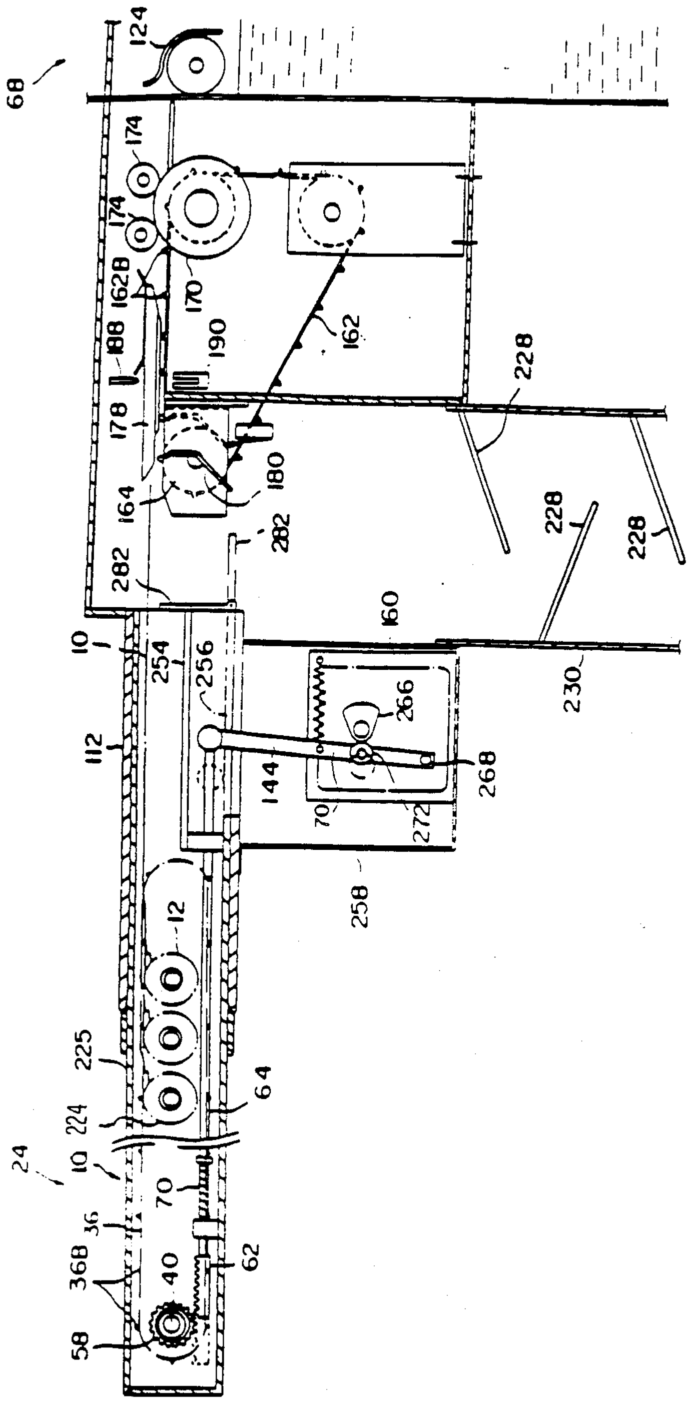
FIG. 10 is a longitudinal cross-sectional view illustrating a state in which a magazine in accordance with a second embodiment of the present invention is connected to the developing system.
Figure 11:
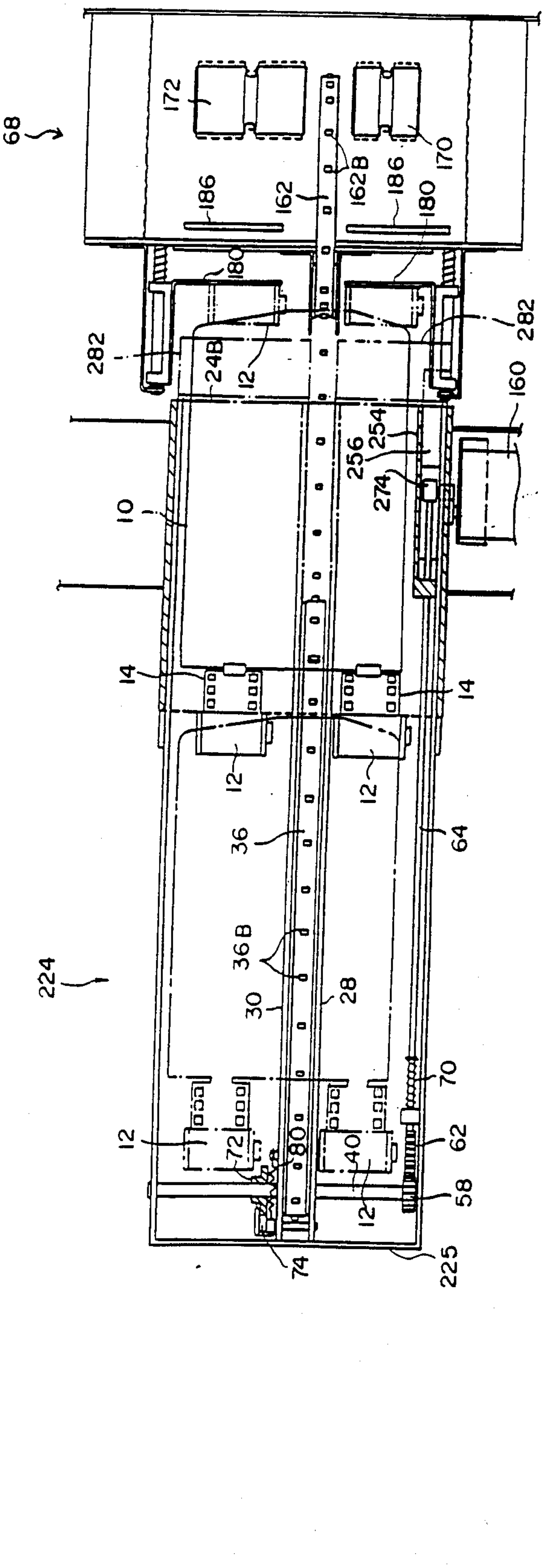
FIG. 11 is a horizontal cross-sectional view of Fig. 10.
Figure 12:
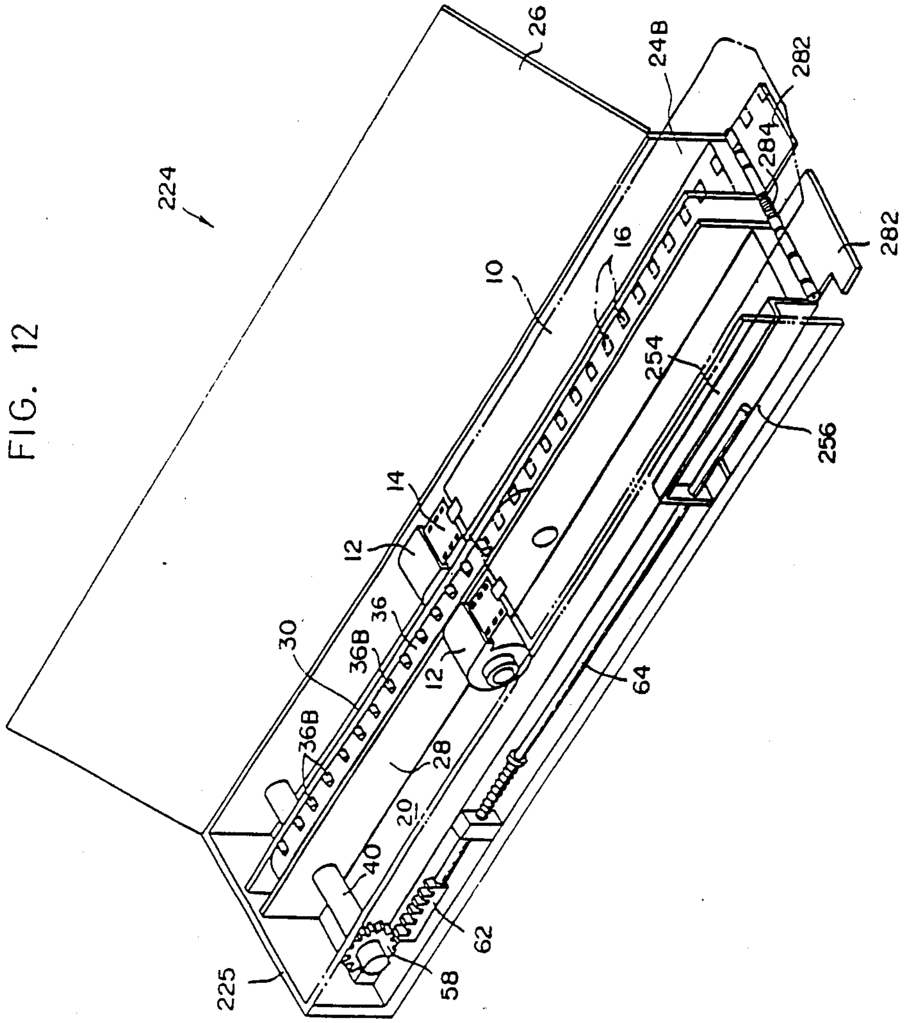
FIG. 12 is a perspective view of the magazine in accordance with the second embodiment.

A driving means 142 for operating the magazine 24 is disposed adjacent to the lock means 114. As shown in Fig. 9, this driving means 142 is guided by a cylinder 143, and a drive rod 144 which is axially slidable is disposed with its distal end portion corresponding with the distal end portion of the rod 64. A roller 146 corresponds with the other end portion of the drive rod 144.

This roller 146 is pivotally supported by a distal end portion of a crank arm 148. The proximal end portion of a crank arm 152 is secured to a rotary shaft 150 to which the proximal end portion of the crank arm 148 is secured and which is pivotally supported by the main body 102. A roller 154 is pivotally supported by a distal end portion of the crank arm 152 and abuts against the outer periphery of an eccentric cam 156. A shaft 158 of the eccentric cam 156 is fixed to an output shaft of a motor 160.

This motor 160 is controlled by the control circuit 130. The arrangement is such that, during rotation, the eccentrice cam 156 rotates the crank arm 152 about the axial center of the rotary shaft 150, thereby pushing up the drive rod 144 via the crank arm 148 and the roller 146. Hence, the rod 64 is pushed into the magazine 24 by the drive rod 144, so that the leader 10 is pushed out from the magazine 24, allowing its distal end portion to be engaged with an endless driving belt 162.

This endless driving belt 162 is entrained between a pair of gears 164, 166 inside the supplying section 110, and its projections 162A projecting from the inner peripheral portion thereof mesh with the gears 164, 166, as in the case of the endless conveyor belt 36 inside the magazine 24. In addition, projections 162B formed on the outer periphery of the endless driving belt 162 are adapted to mesh with the openings 16 of the leader fed from the magazine 24 so as to feed the leader 10 to a developing section 108. For this reason, the endless driving belt 162 is disposed at a position corresponding to the tip portion of the leader fed from the magazine 24.

Figure 2:
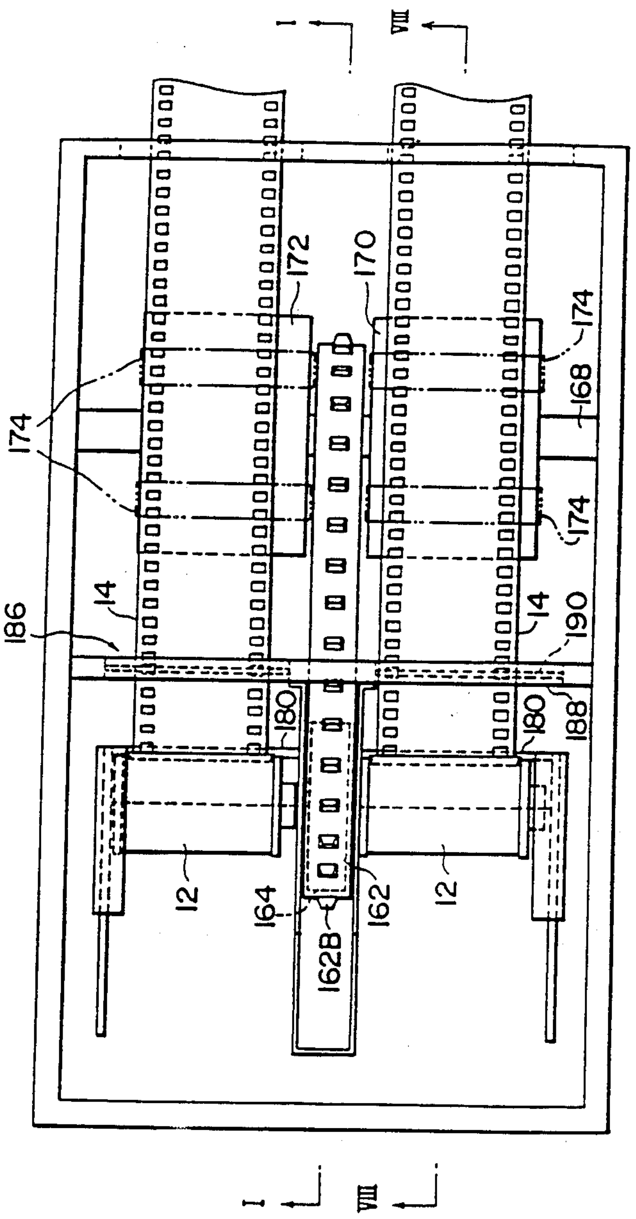
FIG. 2 is a top plan view of the film supplying apparatus with the cover of a supplying section shown in FIG. 1 open.

As shown in FIG. 2, a central shaft 168 of the gear 166 is provided with feed rubber rollers 170, 172 which facilitate the feeding of the film 14 connected to the leader 10. Pressure rollers 174 provided on the supplying section cover 106 abut against these feed rubber rollers 170, 172 and serve to clamp the film 14, thereby allowing the film 14 to be supplied positively to the developing section 108. A pair of film sensors 176 are disposed between these feed rubber rollers 170, 172 and the developing section 108, respectively, and adapted to detect the rear end portions of the films and transmit signals thereof to the control circuit 130.

A guide plate 178 is disposed above the gear 162 so that the leader 10 will engage positively with the projections 162B of the endless driving belt 162, and that the film 14 will be supplied positively onto the rubber rollers 170, 172.

Figure 8:
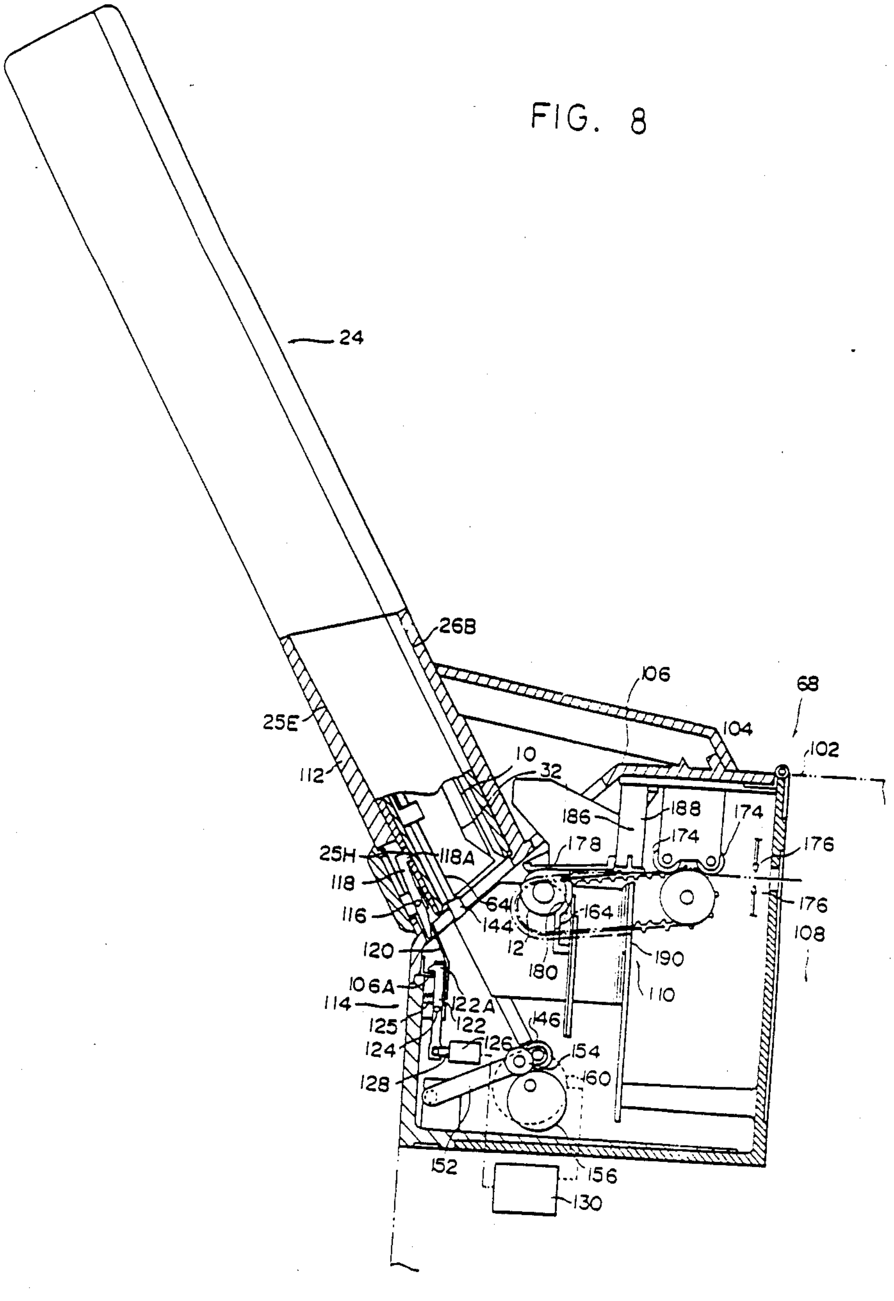
FIG. 8 is a cross-sectional view corresponding to a cross section taken along the line VIII—VIII of FIG. 2 and illustrating a state in which the film is being supplied.

In addition, as shown in FIGS. 2 and 8, patrone supporting plates 180 are respectively disposed on both sides of the gear 164. When the leader 10 is supplied to the developing section 108 by means of the endless driving belt 162, each of these cassette supporting plates 180 supports the cassette connected to the leader 10 via the film 14, and is capable of withdrawing only the film 14 into the developing section 108.

These cassette supporting plates 180 are movable in the directions of approaching and moving away from the developing section 108 by means of a guide means (not shown), and is normally pressed by the urging force of a resilient member in the direction of moving away from the developing section 108. However, when all the film 14 inside the patrone 12 has been withdrawn, this patrone supporting plate 180 is adapted to be capable of approaching the developing section 108 upon receipt of the tension applied to the film 14 via the winding core 12A The state of this approach is detected by a limit switch (not shown), and its signal is delivered to the control circuit 130.

A pair of cutters 186 which are driven by the control circuit 130 when the film end has been detected are interposed between the patrone supporting plates 180 and the developing section 108. Each of these cutters 186 is arranged such that an upper blade 188 and a lower blade 190 are respectively disposed above and below the moving locus of the film 14 and adapted to clamp and cut the film 14 with the upper blade 188 and the lower blade 190 when the latter is raised by a driving means such as a solenoid (not shown)

Description will now be made of the operation of the present embodiment.

A plurality of the leaders 10 each connected in advance to the films 14 by means of the adhesive tape 20 are prepared, and are loaded in the magazine at regular intervals. In this case, it suffices if the leaders are arranged such that their film-connecting end portions are respectively made to abut against the engaging projections 46 consecutively, beginning with the foremost leader Thus, since the marks 22 are disposed at regular intervals, as shown in FIG. 3B, it is possible to speedily detect a state in which the leaders 10 are disposed in an overlapped state or at different intervals, and to correct it. If the interval between the engaging projection 46 and the apex surfaces of the upright walls 28, 30 is made to be of such a dimension that only one sheet of the leaders 10 can enter, it becomes possible to positively prevent the overlapping of the leaders 10.

With the cover 26 closed over the main body 25 of the magazine 25, the small-diameter portions 25E, 26B are of the magazine 24 are inserted into the cylindrical portion 112.

At this juncture, development work starts if a development start button (not shown) is operated. Since the control circuit 130 actuates the solenoid 126 on starting of the development work, the hook portions 122A, 118A respectively mesh with the hook 106A of the supplying section cover 106 and the opening 25H of the main body 25 of the magazine, thereby preventing the opening of the supplying section cover 106 and the withdawing of the magazine 24. Accordingly, the film being developed will not be exposed to light by inadvertently withdrawing the magazine 24 or opening the supplying section cover 106 while development is being carried out.

Meanwhile, the control circuit 130 drives the motor 160 to rotate the eccentric cam 156. Consequently, the crank arms 152, 156 rotate, and the drive rod 144 pushes the rod 64 into the magazine 24. This rotational force is transmitted to the rack 62, and the pin 54 secured to the rack 62 projects from between the teeth of the pinion 58 to rotate the pinion 58. The rotation of this pinion 58 rotates the endless conveyor belt 36, and the leader is pushed out from the tip portion of the magazine by means of the engaging projections 36B.

Consequently, the distal end portion of the leader 10 is brought into contact with the endless driving belt 162 inside the supplying section 110. In this case, since the endless driving belt 162 is rotated at the same speed as the film conveying speed in the developing section 108, so that its rotational speed is relatively low. In contrast, since the feeding speed of the leader 10 is relatively high, the leader 10 is subjected to a compressive force, and is bent as shown by an alternate long and short dash line in FIG. 1. The bent leader 10 comes into contact with the recesses 32 of the upright walls 28, 30. Consequently, the leader 10 is bent along the advancing direction of the endless conveyor belt 162 in such a state that the leader 10 is liable to receive the driving force of the endless driving belt 162. As the endless driving belt 162 rotates, the projections 162B positively engage with the openings 1 of the leader 10, so that the leader is withdrawn into the developing section 108.

In addition, since the bent leader 10 is separated in the direction of the thickness of the ensuing leader 10, even in cases where the engaging opening 16 is deformed and bites into the opening of the ensuing leader, these leaders are separated from each other, so that the ensuing leader is not carelessly subjected to a tensile force.

If the leader 10 is engaged with the endless driving belt 162, the dimensional relationship is such that the engagement between the leader 10 and the engaging projections 36B is canceled.

When the leader 10 is withdrawn into the developing section 108, the film 14 and the cassette 12 connected to the same are also withdrawn from the magazine 24, and reach the supplying section 110. However, the cassette which has reached the supplying section 110 is brought into contact with the patrone supporting plate 180 and is stopped from moving toward the developing section 108. As a result, the film 14 which is pulled by the leader 110 is removed from the patrone 12, and is supplied to the developing section 108 where development work is carried out.

When the entire length of the film 14 is withdrawn from the patrone 12, the film 14 connected to the end portion of the winding core 12A pulls the patrone 12 into the developing section 108 via the winding core 12A, so that the patrone supporting plate 180 moves toward the developing section 108. Consequently, the cutter 186 is operated, and the end of the film 14 is cut. Simultaneously, the patrone for which the tensile force is thereby canceled drops inside the supplying section 110 and is discharged therefrom.

When the end of the cut film 14 passes by the film sensor 176, the control circuit 130 restarts the motor 160 to raise the drive rod 144 and push rod upwardly. For this reason, the ensuing leader 10 projects into the supplying section 110, and the development work is carried out in a manner similar to that described above.

Next, description will be made of a case where there has arisen a need for developing a separate film urgently by interrupting the current development process during which the films 14 accommodated in the plurality of cassettes 12 housed in the magazine 24 are being continuously developed. In this case, the operator operates an operation button for interrupted development work. In this case, in a state in which the end of the film being developed in the operation has been detected by the film sensor 176, the motor 160 is made inoperative unlike the case of the continuous development. In addition, in this state, energization of the plunger 128 is canceled, and it is made possible to withdraw the magazine 24 and open the supplying section cover 106.

Consequently, the operator opens the supplying section cover 106 clockwise as viewed in FIG. 1 with the pin 104 as the center, manually engages with the endless driving belt 162 the leader 10 connected to the film in the state shown in FIG. 3A, and closes the supplying section cover 106 with the cassettes 12 abutting against the cassette supporting plate 180. This causes the plunger 128 to be energized again, which prevents the supplying section cover 106 from being opened and the magazine 24 from being withdrawn, and the development work is started. Subsequently, when the development of the film 14 which has been supplied manually is completed, the feeding of the films inside the magazine 24 to the supplying section 110, which has been suspended until then, is restarted.

In addition, if other films are to be developed by interrupting work, if there are a multiplicity of such films, these films to be developed urgently are accommodated in a separate magazine, and by supplying this magazine in place of the magazine 24 already connected to the cylindrical portion 112, the same interrupted development work as that in the case where the supplying section cover 106 is opened is carried out. When development work has been completed for these films requiring urgent development, the magazine 24 accommodating the films the development of which has been suspended only needs to be set again in the cylindrical portion 112.

Thus, in cases where the development work is interrupted for the films accommodated in the magazine, after the film being developed which has been withdrawn up to the developing system 68 has been supplied up to the terminating end thereof, the ensuing leader inside the magazine is not fed to the supplying section 110, and the interrupted development work is carried out. Therefore, an unprocessed film in the magazine for which development has been suspended is not exposed to light carelessly.

When development is completed for all of the films accommodated in the magazine 24, the energization of the solenoid 126 is canceled, and the lock means 114 is also cancelled, the operator only needs to withdraw the magazine 24 and reinstall the magazine loaded again with new films into the cylindrical portion 112. In addition, the supplying section cover 106 may be provided with a latch mechanism which is capable of manual cancellation, so as to prevent a careless opening of the cover 106.

FIGS. 10 to 13 show a second embodiment of the present invention.

In this embodiment, the magazine 24 is connected to the developing system 68 in a horizontal state. Unlike the first embodiment described above, the magazine does not have the engaging projections provided on the upright walls 28, 30.

In addition, the means for feeding the leader 10 into the developing system 68 differs from that of the above-described embodiment, and is disposed on one side of the magazine 24 in the direction of its width. In other words, the pinion 58 is secured to an axial end portion of the rotary shaft 40 for engagement with the rack 62. A one-way clutch (not shown) is interposed between this pinion 58 and the rotary shaft 40.

The rod 64 connected to the rack 62 projects into a small box 254 which projects inwardly of a main body 225 of the magazine. This small box 254 is in a light-shielded state with respect to the inside of the main body 225 of the magazine, but a notch 256 is formed at the bottom thereof which serves as an inlet of a drive rod 144. This drive rod 144 is pivotally supported by a pin 268 inside a projecting bracket 258 of the developing system 68, and a roller 272 pivotally supported by an intermediate portion thereof corresponds with a cam 266 for receiving the driving force of the motor 160. Accordingly, the arrangement is such that, at the time when the motor 160 is driven, the cam 266 rotates to cause the rod 144 to rotate the rod. 144 about the pin 268, and drives the endless conveyor belt 36 by predetermined amounts.

A pair of openable plates 282 are pivotally supported at the film supplying port 24B, i.e., the front end portion of the main body 225 of the magazine, and rotate by the urging force of a torsional coil spring 284 to close the film supplying port 24B, excluding a portion where the leader passes, thereby preventing light from entering the inside. Accordingly, this arrangement positively prevents the dropping of cassettes 12 from the magazine 224.

The tensile force applied to the film 14 causes the cassette 12 to rotate the openable plates 282, reach the inside of the developing system 68, and be stopped by the cassettes supporting plate 180.

A chute 230 is disposed below the cassette supporting plate 180 and serves as a port for discharging the cassettes. This chute 230 is provided with a plurality of inclined plates 228 in such a manner that their directions of inclination vary alternately in an alternatingly offset manner. Thus, the cassettes are allowed to be discharged through this chute 230 and accommodated in an accommodating box (not shown) disposed therebelow while the light-shielded is maintained.

Figure 13:
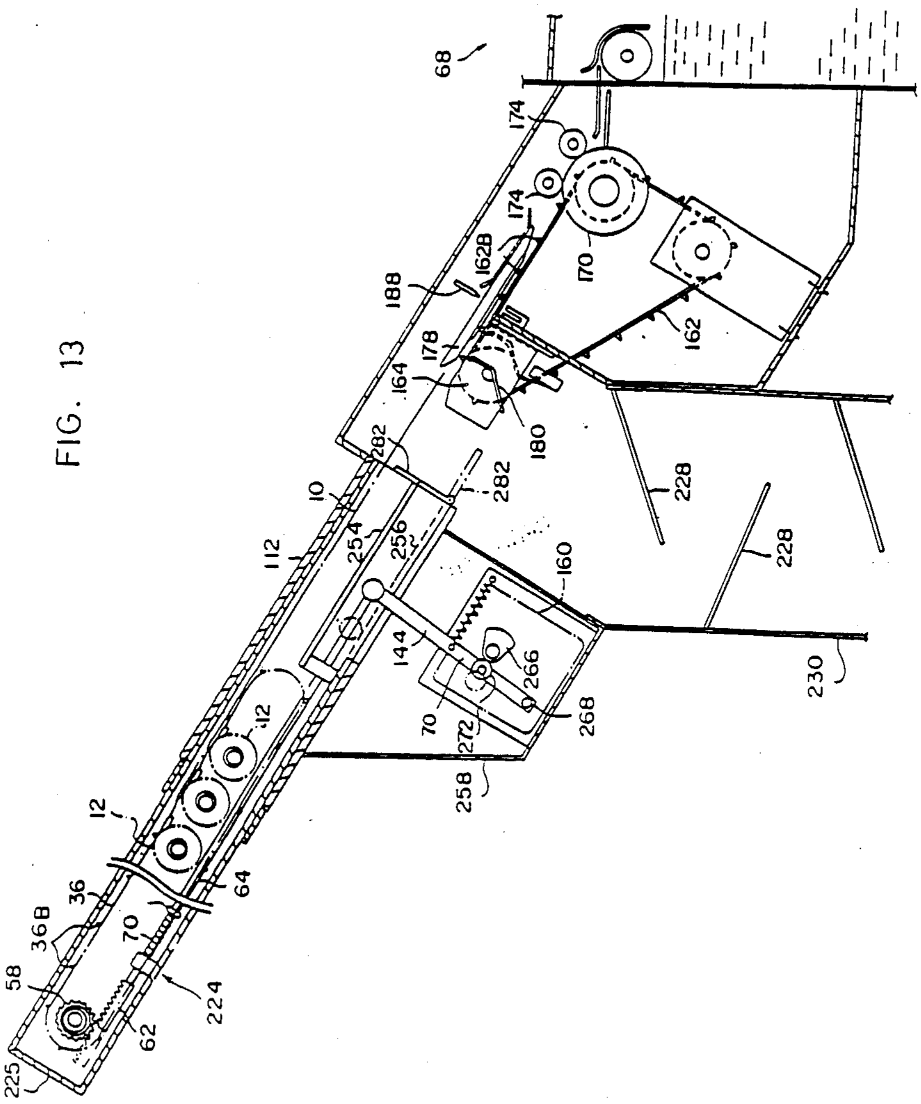
FIG. 13 is a longitudinal cross-sectional view illustrating a third embodiment of the present invention.

FIG. 13 shows a third embodiment of the present invention in which the magazine 224 is connected to the developing system 68 in the inclined state as in the case of the above-described first embodiment. This embodiment has substantially the same structure as that of the second embodiment, except for the fact that the magazine connecting portion is inclined. It is naturally possible to form in the magazine 224 of this embodiment the recesses 32 that are formed on the upright walls 28, 30 of the first embodiment. Furthermore, the magazine may be arranged such as to be set vertically by making the magazine-installing angle more sharply.

Figure 14:
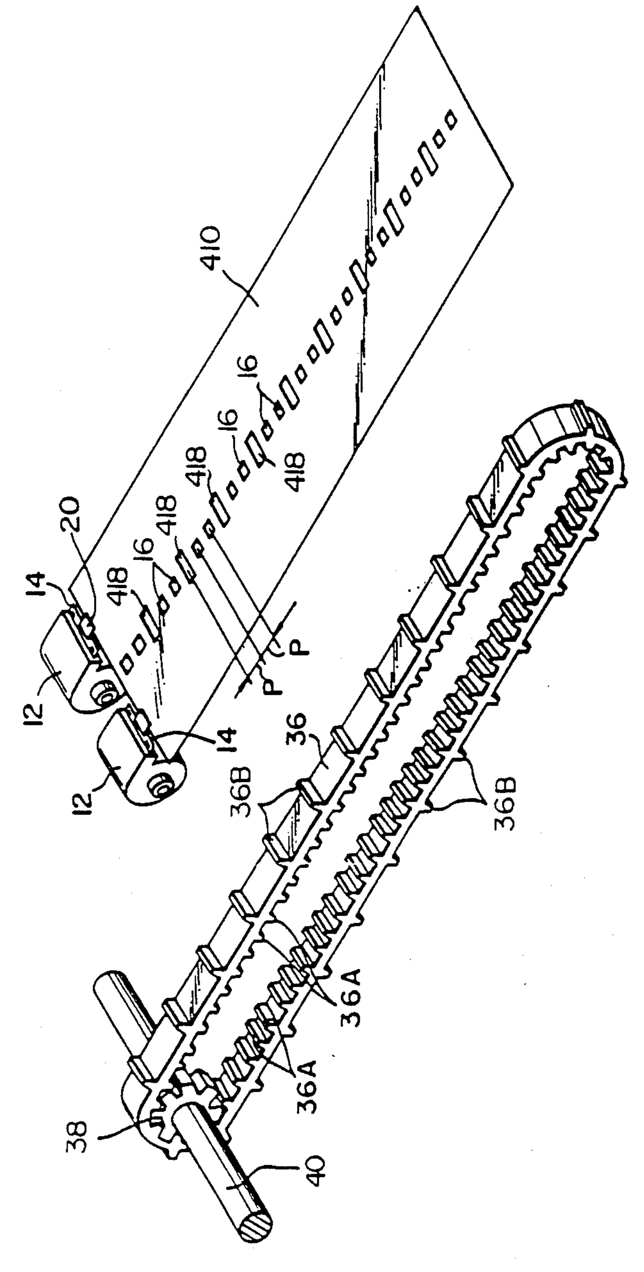
FIG. 14 is a perspective view of the leader and an endless conveyor belt illustrating a fourth embodiment of the present invention.
Figure 15:
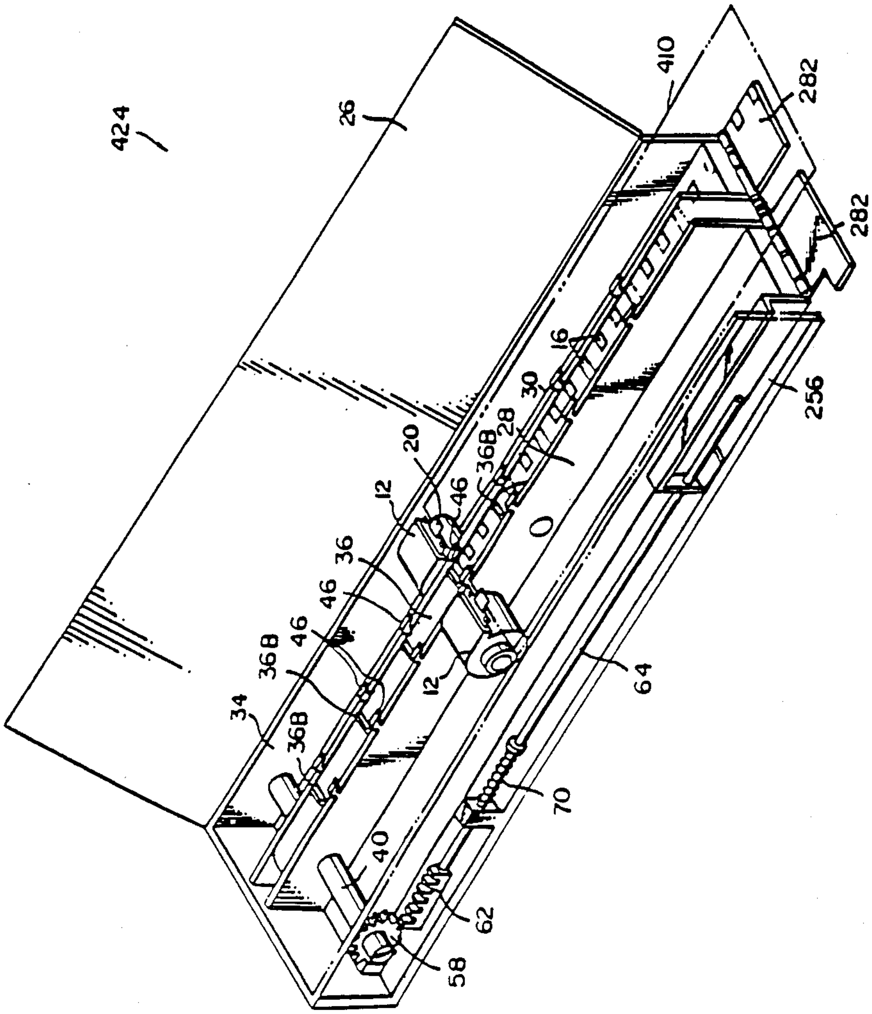
FIG. 15 is a perspective view of the magazine in accordance with the fourth embodiment.

FIGS. 14, 15 show a fourth embodiment of the present invention. In this embodiment, consideration is paid so that leaders 410 are loaded accurately in a magazine 424 at regular pitches In other words, with respect to the openings 16 formed in the leader 410 at regular intervals, feed openings 418 having larger widths are formed at locations of a fixed number (every three openings in the illustrated embodiment). The openings 16 are for engagement with the projections of the endless driving belt inside the developing system, while the feed openings 418 are for engagement with the engaging projections 36B of the endless conveyor belt 36 in the magazine 424. In relation to pitch P of the openings 16, the pitches of the feed openings 418 and the engaging projections 36B are $3\times P$. Accordingly, in this embodiment, the dimension of the engaging projections 36B in the direction thereof orthogonal to the longitudinal direction of the endless conveyor belt 36 is made greater than the width of the projections of the endless driving belt in the development system, so that the engagement projections 36B will not enter the openings 16.

For this reason, if a plurality of the leaders 410 together with the cassettes 12 are accommodated in the magazine 424, these leaders 410 are loaded accurately at the intervals of $(3\times P)$.

In addition, the reverse L-shaped engaging projections 46 similar to those of the first embodiment are provided on the upright walls 28, 30 of the magazine 424 at the same intervals as those of the feed openings 418, and serve to aid the positioning of the leaders These engaging projections 46 positively prevent the overlapping of the leaders 10 since the gap between the same and the apex surfaces of the upright walls 28, 30 is set to less than twice as large as the thickness of the leader 10.

It should be noted that the openings 16 and the feed openings 416 may not be provided along the same row, but may be offset from each other. In this case, the belt 36 is naturally offset correspondingly.

What is claimed is:

1. A magazine for consecutively feeding undeveloped films to a developing system from a plurality of cassettes in which said films are accommodated, comprising:

(a) a main body of said magazine which is capable of accommodating a plurality of cassettes;

(b) an openable cover for preventing the light from entering the inside of said main body of said magazine;

(c) an endless body from which projections for engaging with feed openings of leaders respectively connected to said films projecting from said cassettes project at regular intervals; and (d) a feeding means for receiving a driving force from the outside and moving said endless body at regular intervals, thereby feeding said leaders consecutively to said developing system.

2. A magazine according to claim 1, wherein said magazine is provided with a surface for mounting said leaders, said projections projecting from said mounting surface and engaging with said openings of said leaders.

3. A magazine according to claim 1, wherein portions for accommodating the end portions of said leaders are provided in said magazine at regular intervals to load said leaders thereon at said regular intervals.

4. A magazine according to claim 3, wherein said accommodating portions are formed between said leader mounting surfaces and bent projections projecting therefrom.

5. A magazine according to claim 1, wherein an identifying mark is provided on the tip of each of said leaders projecting from said magazine, whereby, if said leaders are loaded at predetermined intervals, said leaders can be discriminated since said identifying marks are arranged at said predetermined intervals.

6. A magazine according to claim 1, wherein said feeding means is provided with a one-way clutch between a driving source and an endless body for engagement with said leaders, said endless body being moved only in on direction by predetermined distances.

7. A magazine according to claim 1, wherein there is provided adjusting means for stopping said endless body at said predetermined distance.

8. A magazine according to claim 1, wherein a supporting surface capable of supporting said leader in a bent state is provided on said leader mounting surface in the vicinity of a leader outlet portion of said magazine, thereby reducing resistance at the time when said leader is withdrawn in a bent state.

9. A magazine according to claim 8, wherein said supporting surface is a recess formed on said leader mounting surface.

10. A magazine according to claim 1, wherein, in addition to said feed openings, engaging openings for fitting with projections of feeding-in means disposed in said developing system are formed in said leaders, the pitches of said two types of openings being different with respect to each other.

11. A magazine according to claim 10, wherein the widthwise dimension of said feed openings and said projections of said feeding means for fitting therewith is made larger than that of said engaging openings, thereby making it possible for said engaging openings to be fitted with said projections of said feeding means.

12. A film supplying apparatus according to claim 1, further comprising a passage for feeding said film connected to said leader longitudinally provided at each side of said leader feeding means.

* * * * *